United States Patent [19]

Birkner

[11] 4,179,009

[45] Dec. 18, 1979

[54] MOUNTING ARRANGEMENT FOR A LOUDSPEAKER TO A RESONANCE PANEL PERMITTING FRONT INSERTION ASSEMBLY

[75] Inventor: Udo Birkner, Heinde, Fed. Rep. of Germany

[73] Assignee: Blaupunkt-Werke GmbH, Hildesheim, Fed. Rep. of Germany

[21] Appl. No.: 883,813

[22] Filed: Mar. 6, 1978

[30] Foreign Application Priority Data

Mar. 15, 1977 [DE] Fed. Rep. of Germany ....... 2711126

[51] Int. Cl.[2] ...................... G10K 13/00; H04R 7/00; H04M 1/00

[52] U.S. Cl. .................................. 181/171; 179/178; 181/141; 181/150

[58] Field of Search ............... 181/171, 141, 148, 150, 181/199; 179/178, 1 VE

[56] References Cited

U.S. PATENT DOCUMENTS

| | | | |
|---|---|---|---|
| 2,821,260 | 1/1958 | Shaffer | 181/150 |
| 2,913,067 | 11/1959 | Johnston | 181/171 |
| 3,045,776 | 7/1962 | Igarashi | 181/171 |
| 3,666,040 | 5/1972 | Junk | 181/150 |
| 3,892,289 | 7/1975 | Rollins | 181/171 |
| 4,081,629 | 3/1978 | Benesh et al. | 179/178 |

*Primary Examiner*—Stephen J. Tomsky
*Attorney, Agent, or Firm*—Frishauf, Holtz, Goodman & Woodward

[57] ABSTRACT

To mount a loudspeaker from one side only against a resonance panel, typically in a panel of an automotive vehicle on which the rear is, practically, inaccessible, the loudspeaker basket is formed with a holding ring having an outer thread; a mounting ring with an inner thread is secured to the holding ring, the mounting ring being formed with resilient laterally projecting gripper fingers so that, after loose preassembly of the mounting ring on the holding ring and the loudspeaker, the preassembly can be snapped through a loudspeaker opening in the panel, and the speaker then tightened against the panel by engaging the resiliently projecting gripper fingers, now behind the panel, with the rear panel surface, and screwing the loudspeaker tight. An attachment tool in the form of a bail, which can engage in recesses formed at the face of the loudspeaker, for example in holes of a sound panel, is preferably used to facilitate insertion and tightening.

6 Claims, 8 Drawing Figures

FIG. 4
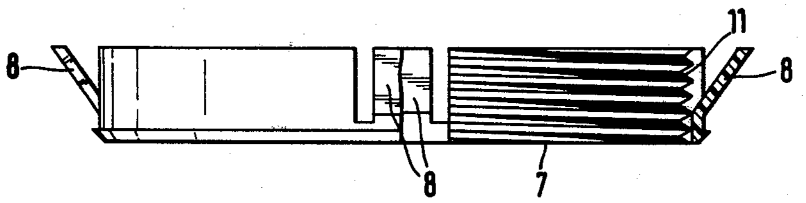
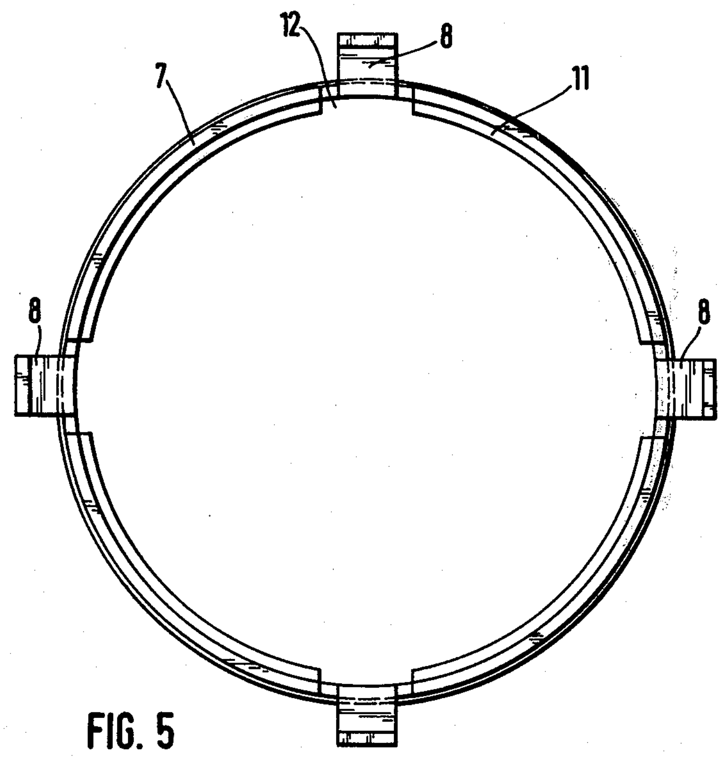
FIG. 5

FIG. 6
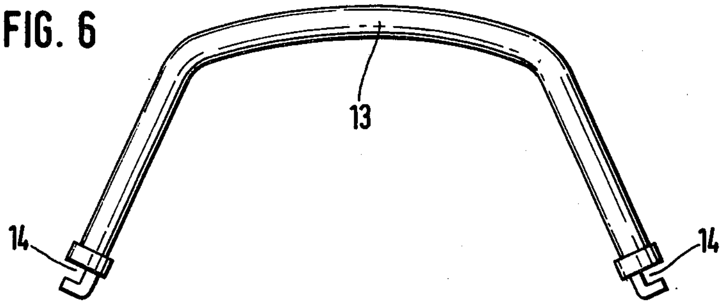
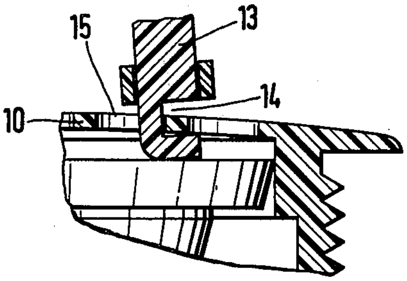
FIG. 8
FIG. 7
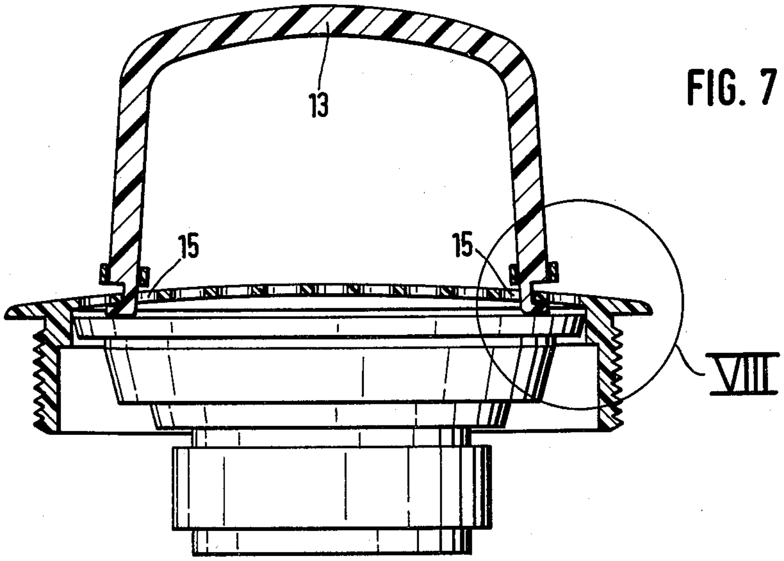

MOUNTING ARRANGEMENT FOR A LOUDSPEAKER TO A RESONANCE PANEL PERMITTING FRONT INSERTION ASSEMBLY

The present invention releates to a mounting arrangement for loudspeakers, and more particularly an arrangement which permits mounting loudspeakers from one side only against a resonance panel, typically to install a loudspeaker in an automotive vehicle, in which the rear of the panel is, for all practical purposes, inaccessible.

Difficulties arise if it is desired to mount loudspeakers in openings in a panel, which forms a resonance wall or resonance panel, if the panel is accessible only from one side. These difficulties are particularly apparent when mounting loudspeakers in automotive vehicles where space is frequently limited and access to the rear of resonance panels may be difficult or impossible.

The Invention.

It is an object to provide an arrangement to mount the loudspeaker on a panel to which access from one side is severely restricted, difficult, or even impossible, so that the loudspeaker is preferably mounted from the front side of the panel, that is, from the side from which sound is to be radiated.

Briefly, the loudspeaker basket is formed with a radially extending flange and, inwardly of the flange, with a holding ring which has an outer thread. A mounting ring, with an inner thread, has a plurality of resilient gripper fingers which extend from the circumference thereof. To assemble the loudspeaker to a panel by front assembly only, the mounting ring is threaded loosely on the holding ring to leave a distance larger than the thickness of the panel between the gripper fingers which project and the flange. The subassembly is then pushed through the loudspeaker opening, permitting the gripper fingers to resiliently deflect inwardly and snap out behind the panel when the loudspeaker is fully inserted. Rotating the loudspeaker then with respect to the outer ring, which can readily be accomplished by frictionally engaging the gripper fingers with the back side of the panel, seats the speaker to the panel.

In accordance with a feature of the invention, a mounting tool is provided in form of a bail which has ends shaped to engage matching projection and recesses, for example sound-passing openings formed in the front cover of the loudspeaker, to hold the speaker and the mounting ring assembled thereto and thereafter permit rotation of the speaker by providing ready engagement therewith.

The system permits reliable and fast assembly of a loudspeaker to a panel from the front only, and thus enables assembly into spaces in which the back side is entirely inaccessible. Such assemblies are particularly useful to instal loudspeakers in the wall panels of automobiles. The attachment arrangement is essentially independent of the thickness of the panel, resulting in a versatile arrangement adaptable to many different types of installations or different types of vehicles.

Drawings, illustrating a preferred example:

FIG. 4 is a side view, partly in section, of the mounting ring;

FIG. 5 is a top view of the mounting ring of FIG. 4;

FIG. 6 is an assembly bail;

FIG. 7 is a schematic sectional view of the loudspeaker and the assembly bail for use in installing the speaker in a panel; and FIG. 8 is a detail view to a greatly enlarged scale of the portion of FIG. 7 which is within the circle VIII.

Figure 1:
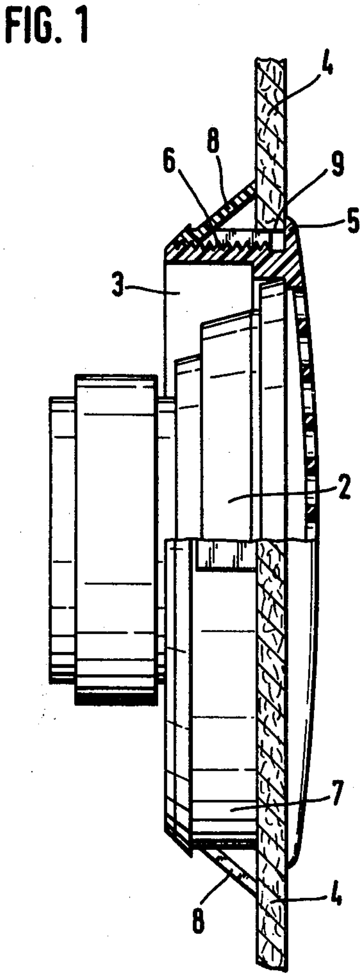
FIG. 1 is a longitudinal part sectional of a loudspeaker installed in a panel.

A loudspeaker has a basket 2, the edge of which has a cylindrical holding ring 3 attached thereto. The holding ring 3 is formed with a frontal radially extending flange 5 adapted to engage over the edge of a loudspeaker opening 9 formed in a holding or resonance panel 4. The holding ring 3 is formed with an outer thread 6. A mounting ring 7 (FIG. 4) is formed with an inner thread 11. The mounting ring 7 has a plurality, preferably four, resilient spring fingers 8 which may be cut out or punched from or bent out from a circumferential portion of the holding ring. The fingers 8, when installed, bear against the rear wall of the panel 4 (see FIG. 1).

Figure 2:
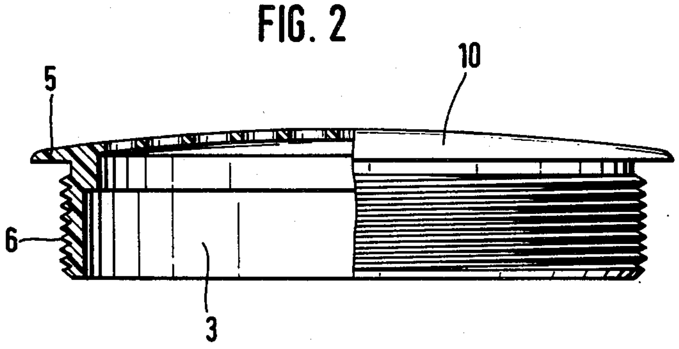
FIG. 2 is a longitudinal part sectional view of the speaker holding arrangement.
Figure 3:
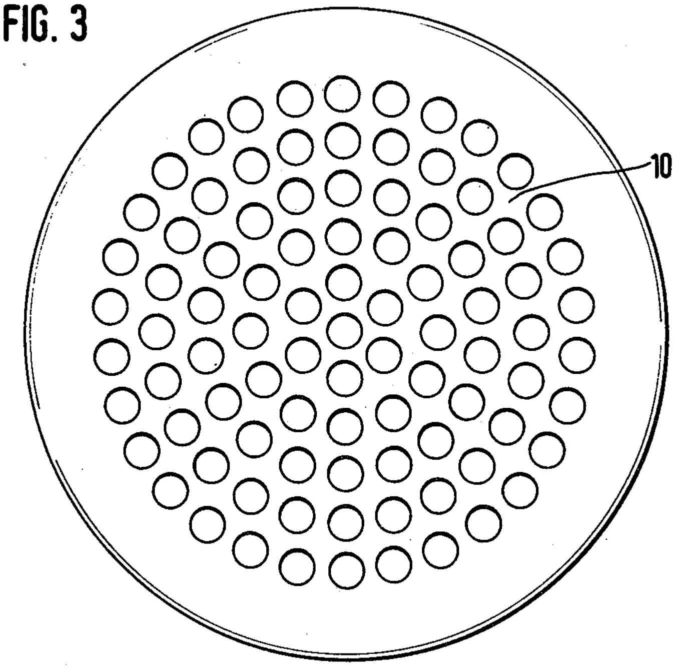
FIG. 3 is a top view of the speaker.

The front of the loudspeaker is covered by a sound disk 10 (FIGS. 2, 3) which is perforated, as best seen in FIG. 3.

The mounting ring 7 (FIGS. 4, 5) is preferably made of an elastic, yielding plastic material. The inner threads 11 thereof match the outer threads 6 of the holding ring 3. The mounting ring 7 is formed with notches in the region of the fingers 8, for example by removal of the material at that region, to permit the fingers 8 to bend resiliently within the outline of a complete circle formed by the outer circumference of ring 7, yet, resiliently, snap apart to the position shown, for example, in FIGS. 1 and 4.

Installation and use: To install the speaker in a panel 4 with an opening 9, the mounting ring 7 is first loosely assembled on the holding ring 3, and screwed on such that the fingers 8 are spaced from the inner edges of the flange 5 by a distance slightly greater than the thickness of the panel 4. The loudspeaker—outer ring subassembly is then pushed from the front into the opening 9. The fingers 8 resiliently deflect into the notches 12 of the ring 7 and then, once behind the panel 4, snap apart (see FIG. 1) such that the ends thereof engage over and beyond the edges of the mounting opening 9. The loudspeaker can then be secured to the panel by rotating the speaker, while slightly axially pulling the loudspeaker outwardly, that is in the direction of the cover plate 10, to engage the fingers 8 with the back side of the panel 4 so that the outer ring will be held stationary by frictional engagement of the fingers with the panel.

In accordance with a preferred feature of the invention, a tool for handling and mouting the speaker is provided, see FIGS. 6–8. A mounting bail 13, of generally U-shape, is formed at the ends with hook-like terminal portions 14 which are shaped to engage into holes 15 (FIG. 7) of the loudspeaker cover 10 (FIG. 3). The hook-like terminals are preferably formed as notches in the bail, which may be made of plastic or metal, and which can be resiliently deformed by squeezing it together, the notches 14 then being engaged with diametrically opposite holes 15 (see FIGS. 7, 8). The bail 13 permits simultaneous application of tension to the front of the loudspeaker for secure engagement of the fingers 8 with the rear side of the panel 4 during rotation of the speaker basket and the holding ring 3 thereof, while also providing a ready handle for the initial insertion of the loudspeaker. Simultaneous tension and rotation result in reliable front installation of the speaker in a panel opening.

Electrical connecting leads to the loudspeaker have been omitted; they would be connected before the speaker is installed. These leads are flexible as is usual, and introducing a few twists upon rotation of the loudspeaker is harmless.

If it should be necessary to remove the loudspeaker, then this can be accomplished by rotating the speaker in the opposite direction to installation, while applying slight tension thereto. Likewise, if it should become loose in use due to vibration, it can be reseated and tightened.

Various changes and modifications may be made within the scope of the inventive concept.

I claim:

1. Mounting arrangement for a loudspeaker to a resonance panel (4) permitting assembly from the front side through an opening (9) in the panel having a holding ring (3) secured to the basket (2) of the loudspeaker and formed with a radially extending flange (5) adapted to overlap the panel (4) at the front side thereof, and comprising, in accordance with the invention, an outer thread (6) formed on the circumference of the holding ring (3);

and a mounting ring (7) having an inner thread matching the outer thread (6) of the holding ring, the mounting ring (7) having a plurality of resilient gripper fingers (8) extending from the circumference thereof which, in normal position, extend outwardly from the outline thereof and beyond the back side of the panel (4) and being resiliently movable to within essentially the outline of the mounting ring (7) to permit snapping the assembly of the mounting ring and of the loudspeaker with the holding ring (3) thereon through the opening (9) and subsequent tightening of the loudspeaker flange (5) against the panel (4) by rotating the loudspeaker and the holding ring in the inner threads of the mounting ring, which is then held against rotation by frictional engagement of the gripper fingers (8) with the rear side of the panel (4).

2. Arrangement according to claim 1, wherein the mounting ring (7) is formed with axially extending notches or recesses opposite the position of the gripper fingers (8) to permit the gripper fingers to deflect within the outline of the mounting ring when it is being pushed through the opening (9) of the panel.

3. Arrangement according to claim 1, wherein the mounting ring is made of resilient, plastic material.

4. Arrangement according to claim 1, further including a speaker cover (10) secured to the front side of the loudspeaker basket (2), the speaker cover (10) including recess means (15) to permit engagement of the front of the speaker cover by a turning tool.

5. Arrangement according to claim 1, in combination with a mounting and assembly tool, wherein the loudspeaker includes a speaker cover (10) secured to the speaker basket (2), the speaker cover being formed with a plurality of openings (15) distributed about the front surface thereof;

and wherein the mounting tool comprises a generally U-shaped bail (13), the end portions of the legs of the U-shaped bail being formed with hook-like elements (14) having a size to fit into and match diametrically positioned openings (15) in the loudspeaker cover (10), the hook-like element permitting simultaneous application of tension and torque to the loudspeaker cover (10) and hence to the basket (2) of the loudspeaker, and the inner ring (3) thereof.

6. Arrangement according to claim 5, wherein the hook-like ends are formed as notches (14) in the material of the bail to provide for engagement behind the loudspeaker cover (10) through an opening (15) thereof and lateral engagement against the side of the cover adjacent the opening to permit said simultaneous application of tension and torque to the loudspeaker.

* * * * *